United States Patent [19]
Sugai et al.

[11] Patent Number: 5,428,725
[45] Date of Patent: Jun. 27, 1995

[54] SYSTEM FOR PERFORMING COORDINATE TRANSFORMATION OF SOURCE IMAGE DATA

[75] Inventors: Kazuo Sugai, Yokohama; Masatoshi Hino, Zama; Kouji Fukuda, Kawasaki; Kazutaka Itou, Nagoya; Hideo Haruta, Yokohama, all of Japan

[73] Assignees: Hitachi, Ltd., Tokyo; Hitachi Microsoftware Systems, Inc., Yokohama; Hitachi Asahi Electronics Co., Ltd., Owariasahi, all of Japan

[21] Appl. No.: 98,420

[22] Filed: Jul. 27, 1993

Related U.S. Application Data
[63] Continuation of Ser. No. 536,967, Jun. 12, 1990, abandoned.

[30] Foreign Application Priority Data
Jun. 14, 1989 [JP] Japan .................. 1-149676

[51] Int. Cl.⁶ .................................. G06T 3/60
[52] U.S. Cl. .................... 395/136; 395/164; 395/166; 395/425
[58] Field of Search ................ 395/133–139, 395/145, 147, 152, 155, 161, 162–166, 400, 425; 364/DIG. 1, DIG. 2

[56] References Cited
U.S. PATENT DOCUMENTS
| | | | |
|---|---|---|---|
| 4,797,836 | 1/1989 | Witek et al. | 395/152 |
| 5,131,080 | 7/1992 | Fredrickson et al. | 395/164 |
| 5,276,778 | 1/1994 | Kumagai | 395/100 |

FOREIGN PATENT DOCUMENTS
63-129476 6/1988 Japan .................. G06F 15/66

OTHER PUBLICATIONS
"Am95C76 Orthogonal Rotation Processor (ORP)", #09332 Rev. B, Amendment/0, Sep. 1987.

*Primary Examiner*—Almis Jankus
*Attorney, Agent, or Firm*—Fay, Sharpe, Beall, Fagan, Minnich & McKee

[57] ABSTRACT

An image data processing system which includes an image memory and an image processor for performing coordinate transformation of source image data expressed by two dimensional coordinates. The image processor includes image memory in which data of source and destination images are stored, a coordinate calculator which calculates at least x and y addresses at a position of a pixel in the source image on the basis of x and y addresses at a position of an associated pixel in the destination image, an interpolation calculator which calculates a pixel value of the destination pixel position through interpolation of source pixel values in the vicinity of the corresponding position in the source image, and a cache apparatus which holds therein part of the pixel values of the source image stored in the image memory, wherein the x and y addresses of the corresponding pixel position of the source image are used as tag and as an index for the cache apparatus respectively, whereby the high rate of the cache apparatus can be increased and the entire processing speed of the image data processing system can be increased.

14 Claims, 17 Drawing Sheets

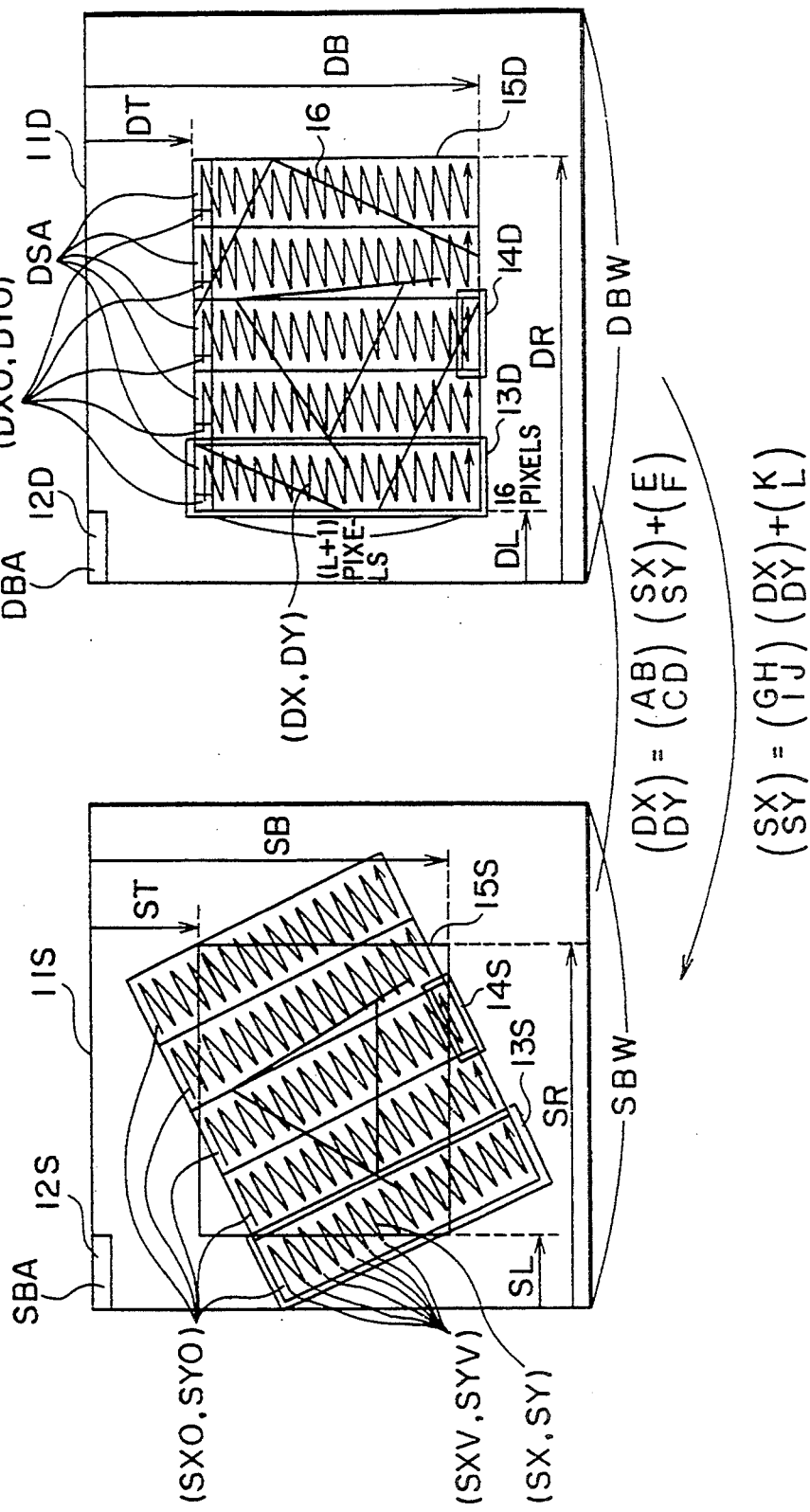

IMAGE MEMORY MAP

RELATIONSHIP BETWEEN
IMAGE MEMORY AND IMAGE

F I G. 9
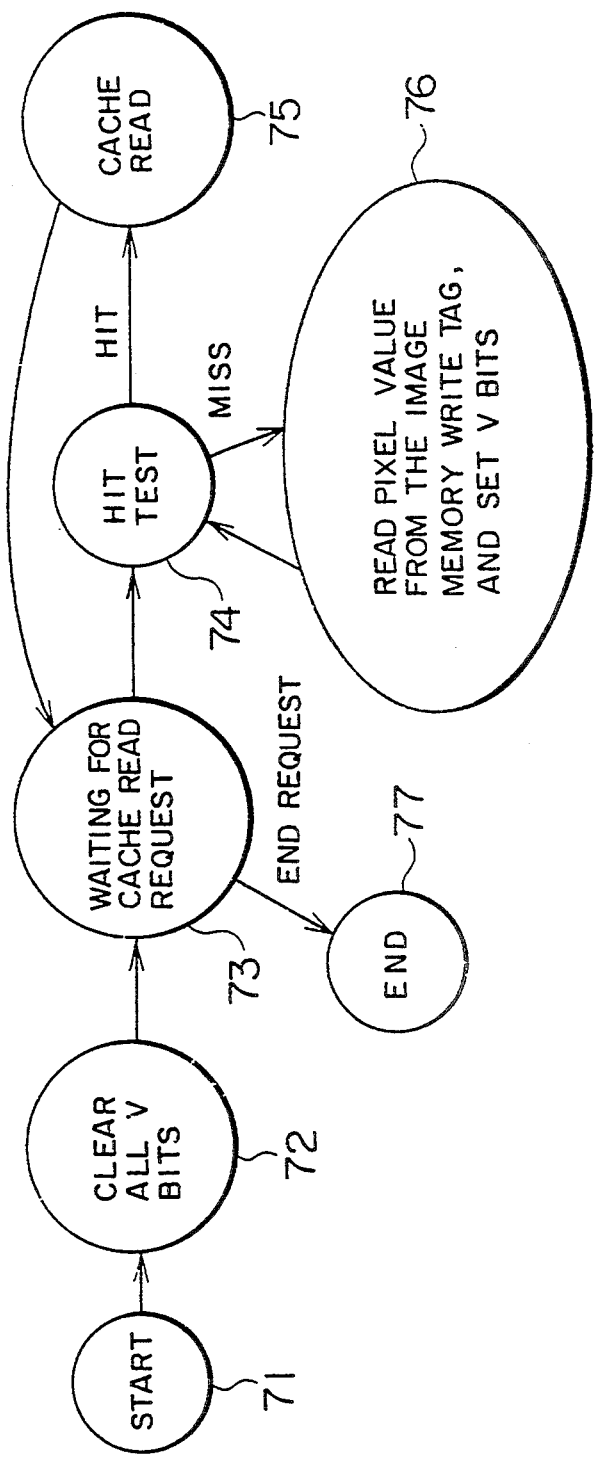

ARRANGEMENT OF READ REQUEST ARBITER 32D

FIG. 12B DESTINATION IMAGE

FIG. 12A SOURCE IMAGE

SYSTEM FOR PERFORMING COORDINATE TRANSFORMATION OF SOURCE IMAGE DATA

This application is a continuation application of U.S. Ser. No. 07/536,967, filed Jun. 12, 1990, now abandoned.

BACKGROUND OF THE INVENTION

The present invention generally relates to image data processing systems and, more particularly, to an image data processing system which can minimize the frequency of access to an image memory in processing of an image data.

A related art image data processing system is arranged, for example, as disclosed in JP-A-63-129476 so that the coordinate calculation and interpolation calculation in affine transformation are carried out at a high speed on a hardware basis. However, the related art system is defective in that the frequency of access to an image memory is high, and thus it is impossible to further increase the processing speed of the entire system.

A system for taking part of zone of an image into a processor for rotation processing is discussed, for example, in the Preliminary Publication titled "Am 95c 76 (A.M.D.). Orthogonal Rotation Processor (ORP)", #09332. Rev. B. Amendment/0 (September, 1987). In this system, however, it has been impossible to process an ordinary image because it only handles every 90° rotation.

The first-mentioned related art system is defective in that no consideration is paid to the frequency of access to the image memory and thus it is impossible to further increase the processing speed of the entire system. The second related art system is disadvantageous in that the processing of this system is limited to every 90° rotation and it is impossible to use the system for ordinary image processing.

SUMMARY OF THE INVENTION

It is an object of the present invention to provide an image data processing system which can minimize the frequency of access to an image memory in processing ordinary image data, thus realizing an increased processing speed of the entire system.

Another object of the present invention is to provide an image data processing system in which an image cache is used in addition to an image memory.

A further object of the present invention is to provide an image data processing system using an image cache which enables reduction of the frequency of access to an image memory and also enables increase of the processing speed of the entire system.

In accordance with an aspect of the present invention, the above objects can be attained by providing an image data processing system for performing coordinate transformation over a source image data expressed in a two-dimensional coordinate system, and which comprises coordinate calculating means for preparing a memory address of a destination image, two-dimensional x and y address of a source image and a memory address of the source image; pixel-value preparing means for preparing a pixel value of the destination image on the basis of the two-dimensional x and y addresses of the source image and a pixel value of the source image; and cache means of image data which uses upper and lower bits of the two-dimensional x and y addresses of the source image as a tag and index respectively.

More specifically, there is provided an image data processing system including at least an image memory and an image processor for performing coordinate transformation over a source image data expressed in a two-dimensional coordinate system. The image processor of the image processing system comprises coordinate calculating means for calculating the x and y addresses of the corresponding pixel position the source image from the x and y addresses of the pixel position of the destination image, interpolation calculating means for calculating a pixel value of the destination pixel position through interpolating pixel values in the vicinity of the calculated pixel position of the source image, and image cache means for holding therein part of the pixel values of the source images stored in the image memory. Upper and lower bits of the x and y addresses at the corresponding pixel position of the source image are used as a tag and index for the image cache means, respectively.

With such an arrangement as mentioned above, pixels located closely on the destination image are sequentially prepared so that pixels closer to the accessing pixel of the source image are sequentially accessed to prepare the pixel values of the destination image, whereby the hit rate of the cache means can be improved and the processing speed of the entire system can be increased. Further, the image memory is arranged so that the writing and reading of a zone elongated in the horizontal (vertical) direction on the image can be realized and the accessing position of the image memory is sequentially moved in the vertical (horizontal) direction, thus improving the hit rate of the cache means.

Preferably, the cache means comprises a group of registers within the image processor to allow high speed accessing, whereby, even accessing to the cache means on a pixel-after-pixel basis enables high speed processing. The coordinate transformation for image processing is preferably affine transformation. The employment of the affine transformation enables high speed processing through the hardware arrangement of coordinate and interpolation calculations. As a result, the interior processing speed of the image processor can be increased and thus the entire processing speed of the image data processing system can also be increased.

BRIEF DESCRIPTION OF THE DRAWINGS

FIGS. 2A and 2B schematically show diagrams for explaining how to transform an image in the first embodiment of the present invention;

FIG. 9 is a transit status diagram showing the operation of the image cache means 32b in FIG. 8;

DESCRIPTION OF THE PREFERRED EMBODIMENTS

Specific embodiments of the image data processing system of the present invention will be described with reference to the attached drawings.

Figure 1A:
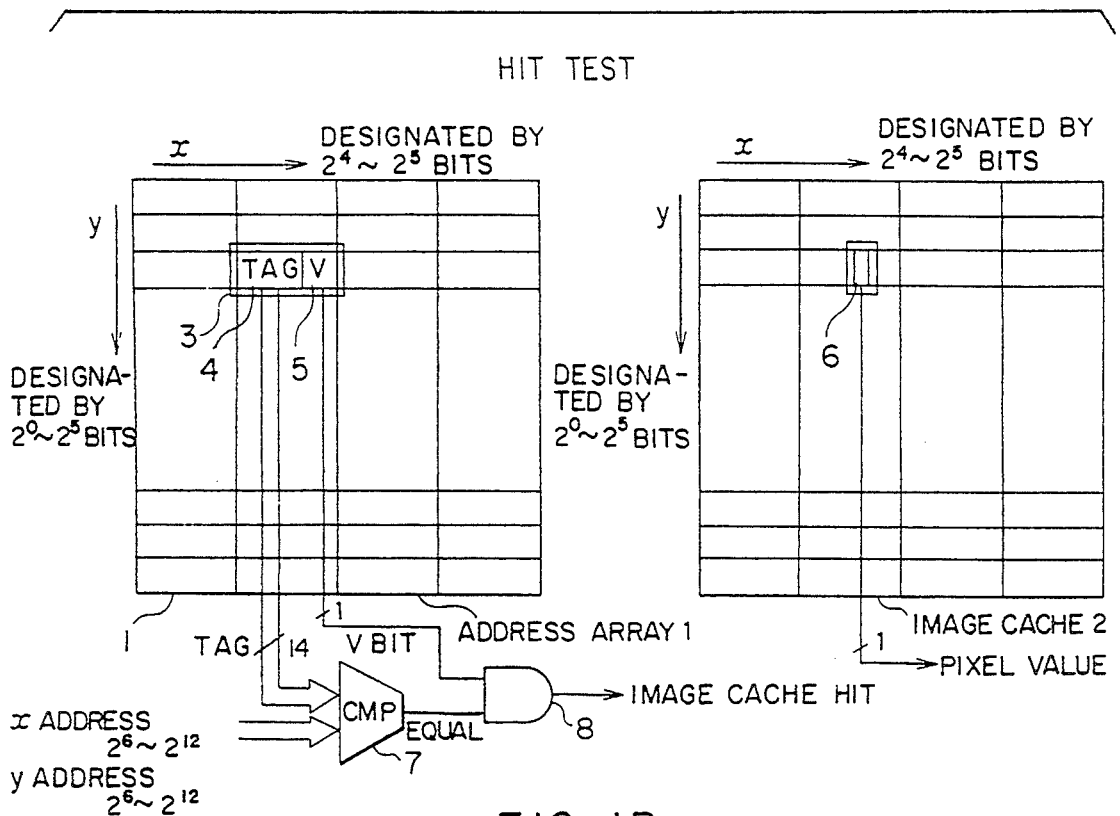
FIGS. 1A and 1B schematically show diagrams for explaining the operation of an image cache used in a first embodiment of the present invention.
Figure 1B:
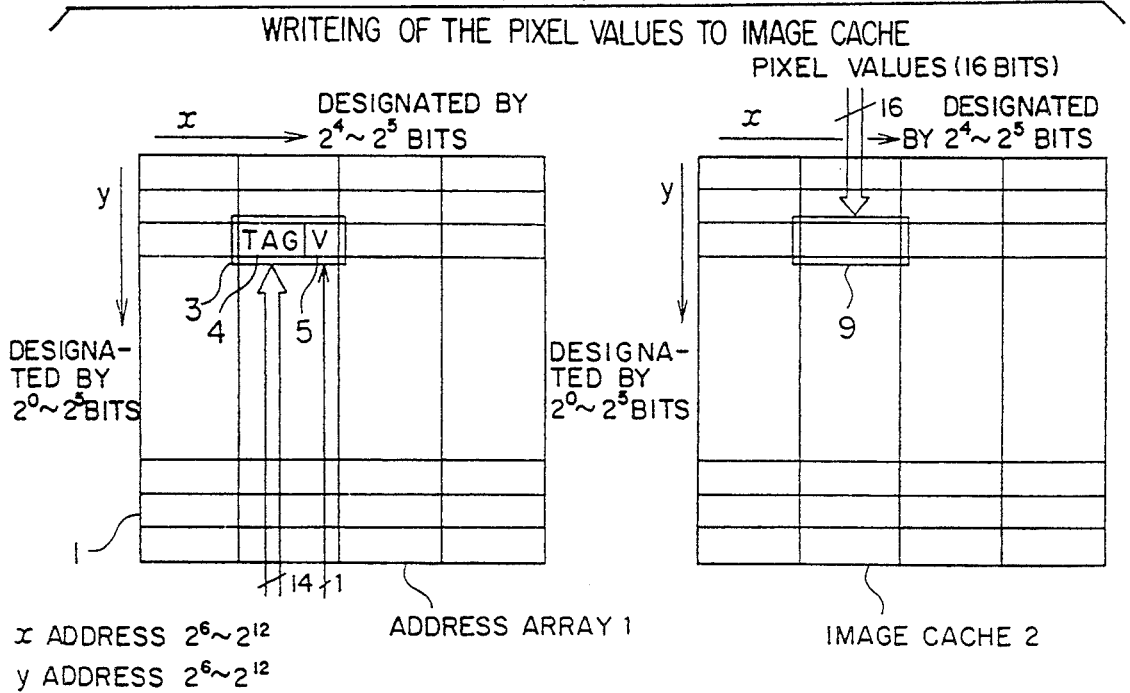

FIGS. 1 to 11 are diagrams for explaining a first embodiment of the present invention, FIGS. 1A and 1B are for explaining the operation of an image cache of a first embodiment. FIGS. 2A and 2B are diagrams for explaining how to transform an image data in the first embodiment. FIGS. 3A, 3B and 3C are diagrams for explaining the structure of an image data memory in the first embodiment. In the present embodiment, the transformation from a position (SX, SY) on a source image shown in FIG. 2A to a position (DX, DY) on a destination image shown in FIG. 2B is carried out through the affine transformation as expressed by the following equation (1).

$$\begin{pmatrix} DX \\ DY \end{pmatrix} = \begin{pmatrix} A & B \\ C & D \end{pmatrix} \begin{pmatrix} SX \\ SY \end{pmatrix} + \begin{pmatrix} E \\ F \end{pmatrix} \quad (1)$$

The position (SX, SY) on the source image corresponding to the position (DX, DY) on the destination image is calculated in accordance with an inverse transformation of the affine transformation as shown in the following equation (2).

$$\begin{pmatrix} SX \\ SY \end{pmatrix} = \begin{pmatrix} G & H \\ I & J \end{pmatrix} \begin{pmatrix} DX \\ DY \end{pmatrix} + \begin{pmatrix} K \\ L \end{pmatrix} \quad (2)$$

Figure 3B:
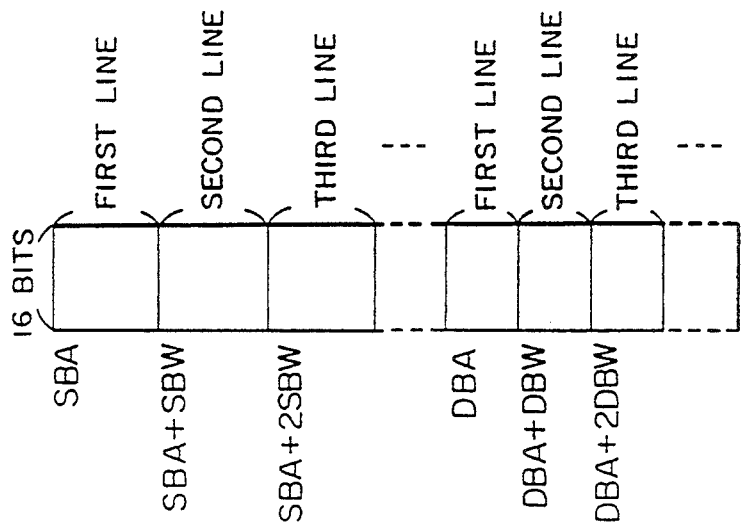
FIGS. 3A, 3B and 3C schematically show diagrams for explaining a relationship between an image memory and an image, an image memory map and interpolation calculation in the first embodiment of the present invention, respectively.
Figure 3A:
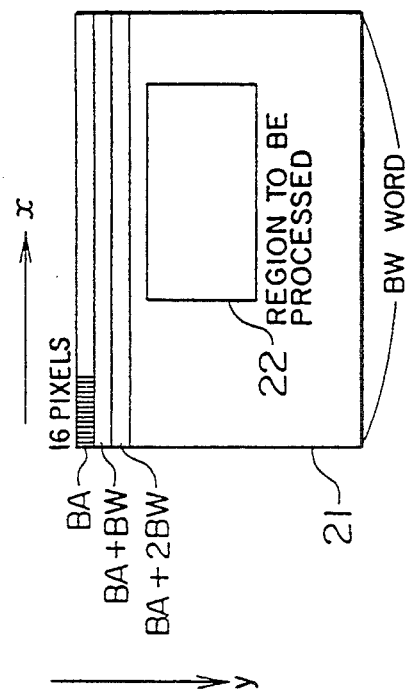
Figure 3C:
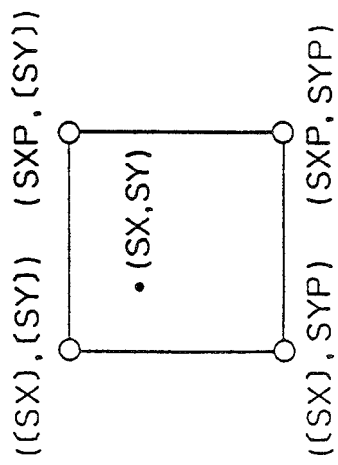

And the values of the source image at the position (SX, SY) are calculated through interpolation of the values of four picture elements (pixels) enclosing the position (SX, SY) on the source image to be used as the pixel values of the destination image at the position (DX, DY) as shown in FIG. 3C.

A structure of an image memory 21 in the present embodiment is shown in FIG. 3A, from or into which 16 pixels (one word) at positions (16n, m) to (16n+15,m) (where n and m are integers) are intended to be read or written at the same time. In this embodiment, monochrome one bit per pixel image memory system is expected. An address in the image memory 21 with respect to a word containing a pixel (x, y) (where x and y are integers) is expressed in the form of BA+y×BW+[x/16]. In this case, a zone containing the source image and a zone containing the destination image are different in the base address BA and base width BW, and symbol [ ] means to represent an integral part of a real number.

The base address BA is set, for example, at the heading address of a zone pre-reserved by an application. Further, the base width BW is set, for example, to be the number of words corresponding to one line determined by an application. The base width BW is also determined by the restrictions of a system such as the zone of a video RAM. In FIG. 3A, an increasing (positive) x-axis and an increasing (positive) y-axis are set to be directed horizontally rigithwardly and vertically downwardly respectively. Further, FIGS. 2A and 2B show source and destination images respectively. The base address BA and base width BW are both defined for source and destination image independently, and are referred to as the source base address SBA AND source base width SBW respectively; and the base address BA and base width BW of the zone containing the destination image are referred to as the destination base address DBA and destination base width DBW respectively. The corresponding image memory map is shown in FIG. 3B.

In FIGS. 2A and 2B, reference symbol 11S denotes the zone containing the source image, symbol 11D denotes the zone containing the destination image, 12S denotes the heading word of the zone containing the source image, SBA denotes the memory address of the heading word 12S, 12D denotes the heading word of the zone containing the destination image, DBA denotes the memory address of the heading word 12D. Further, symbol 15S denotes a region to be subjected to a source image processing prescribed by parameters ST, SB, SL and SR (which region is also called the source image processing region). When four pixels enclosing the position (SX, SY) shown by the equation (2) are all located within the source image processing region 15S, the destination pixels are calculated and written into the destination image zone 11D. Reference symbol 15D denotes a region to be subjected to a destination image processing prescribed by parameters DT, DB, DL, and DR (which region is also called the destination image processing region). The position (SX, SY) is calculated in accordance with the equation (2) with respect to the position (DX, DY) within the region 15D. Accordingly, in the illustrated example, an area within the destination image region 11D in which pixels are to be written is an area 16 corresponding to a common part of the destination image processing region 15D and a region of a transformation of the source image processing region 15S on the destination image zone 11D.

When all bits within one word lie in the area 16, pixel values corresponding to the one word are prepared and then written. When some pixels within one word are located outside the area 16 as in the case of such a word as shown by 14D, the data of the word 14D is first read out, a write data for the word 14D is prepared in an image processor, which is executed as follows. Pixel values prepared from the source image are used for some bits of the write data of the word 14D located within the area 16, while pixel values read out from the word 14D are used for the other bits located outside the area 16 and then written into the word 14D. This pair of sequential operations will be referred to as the read modify write operation. When all the bits of the one word are located outside the area 16, no writing operation is carried out.

Figure 4:
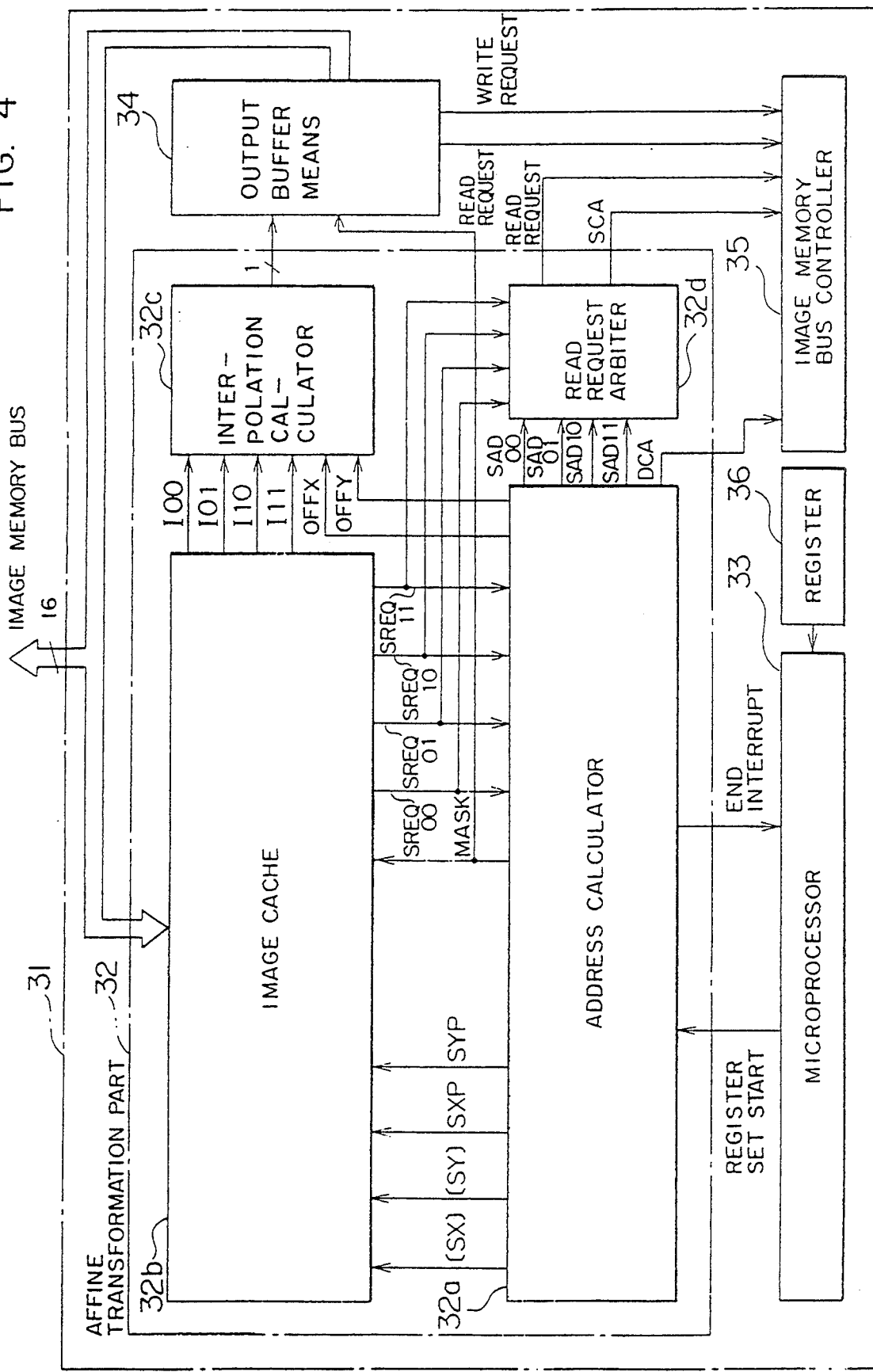
FIG. 4 is a block diagram of an embodiment of an image processor in the first embodiment of the present invention.

Referring to FIG. 4, there is shown a block diagram of an embodiment of an image data processor 31 realizing the present embodiment, which processor includes an affine transformation part 32 and a microprocessor 33 for controlling the affine transformation part 32. The microprocessor 33, is located in the image processor 31, which is different from a microprocessor for the system, and which functions to control the image processor 31. In the present embodiment, the affine transformation part 32, when activated by the microprocessor 33, prepares a destination image data having a size corresponding to 16 pixels (horizontal×(l+1) pixels (vertical (l=DB−DT being calculated in the microprocessor 33 and set in the register within the affine transformation part 32).

In the present embodiment, therefore, when it is desired to generate a destination image data of a size corresponding to several words in the horizontal direction, the microprocessor 33 activates the affine transformation part 32 several times. An output buffer 34, which is also included in the image processor 31, accumulates an image data corresponding to one word prepared on pixel after pixel basis in the affine transformation part 32 and then outputs the one-word data to an image memory (not shown). When some bits of the one word are located outside the area 16 as in the case of the word 14D, the data of the word 14D is first read out, a write data for the word 14D is prepared and then written in the word 14D, as already explained earlier.

An image memory bus controller 35 is also included in the image processor 31. The affine transformation part 32 reads out the source image data, and the output buffer 34 performs the reading and writing operation over the destination image data, but the transformer 32 and buffer 34 will not output directly an image memory bus control signal necessary for the read and write cycle of the image memory. More specifically, the affine transformation part 32 issues a source image data read request to the image memory bus controller 35, whereas the output buffer 34 issues to the image memory bus controller 35 a destination image data read request and a destination image data write request. The image memory bus controller 35, when receiving the source image data read request and the destination image data read request, starts the image memory read cycle. The controller 35, when receiving the destination image write request, starts the image memory write cycle.

Reference numeral 36 denotes a plurality of registers for setting parameters necessary for image processing. The parameters necessary for the image processing are set in the registers by a system control processor (not shown). The microprocessor 33 reads the parameters set in the registers and calculates parameters to be set in an address calculator 32a provided within the affine transformation part 32.

The address calculator 32a scans x and y addresses DX and DY for the destination image and generates x and y addresses SX and SY for the corresponding source image, an image memory address DCA of a word including the position (DX, DY) on the destination image and image memory addresses SAD00, SAD10 and SAD11 of four pixels of a word surrounding the position (SX, SY) on the source image. The addresses SAD00, SAD01, SAD10 and SAD11 are the image memory addresses of a word containing upper-left, upper-right, lower-left and lower-right pixels respectively.

There are two cases where SAD00=SAD01 and SAD10=SAD11 as shown in FIG. 6A and where all the addresses SAD00, SAD01, SAD10 and SAD11 are different from each other as shown in FIG. 6B. The address calculator 32a generates a FLAG MASK which is set at "1" when at least one of the four pixels surrounding the position (SX, SY) is located outside the source image processing region 15S (refer to FIG. 2A). In other words, the flag MASK is set at "1" when the destination position (DX, DY) is outside the area 16 (refer to FIG. 2B).

An image cache 32B, which is provided in the affine transformation part 32, receives the source image data on a cache basis. An interpolation calculator 32c, which is also provided in the affine transformation part 32, calculates pixel values for the destination position (DX, DY) through interpolation with use of the pixel values of the four pixels (refer to FIG. 3C) surrounding the position (SX, SY) on the source image.

A read request arbiter 32d is also provided in the affine transformation part 32. Since the interpolation calculator 32c reads out the pixel values of the four pixels surrounding the position (SX, SY) from the image cache at the same time, there may occur a possibility of simultaneous generation of two or more erroneous bits in the image cache. The read request arbiter 32d, when receiving any of read requests SRQ00, SRQ01, SRQ10 and SRQ11 of the word containing the upper-left, upper-right, lower-left and lower-right pixels, issues a source image data read request to the image memory bus controller 35, selects one of the received read requests and outputs to the image memory bus controller 35 an image memory address SCA for a word corresponding to the selected read request.

Figure 5:
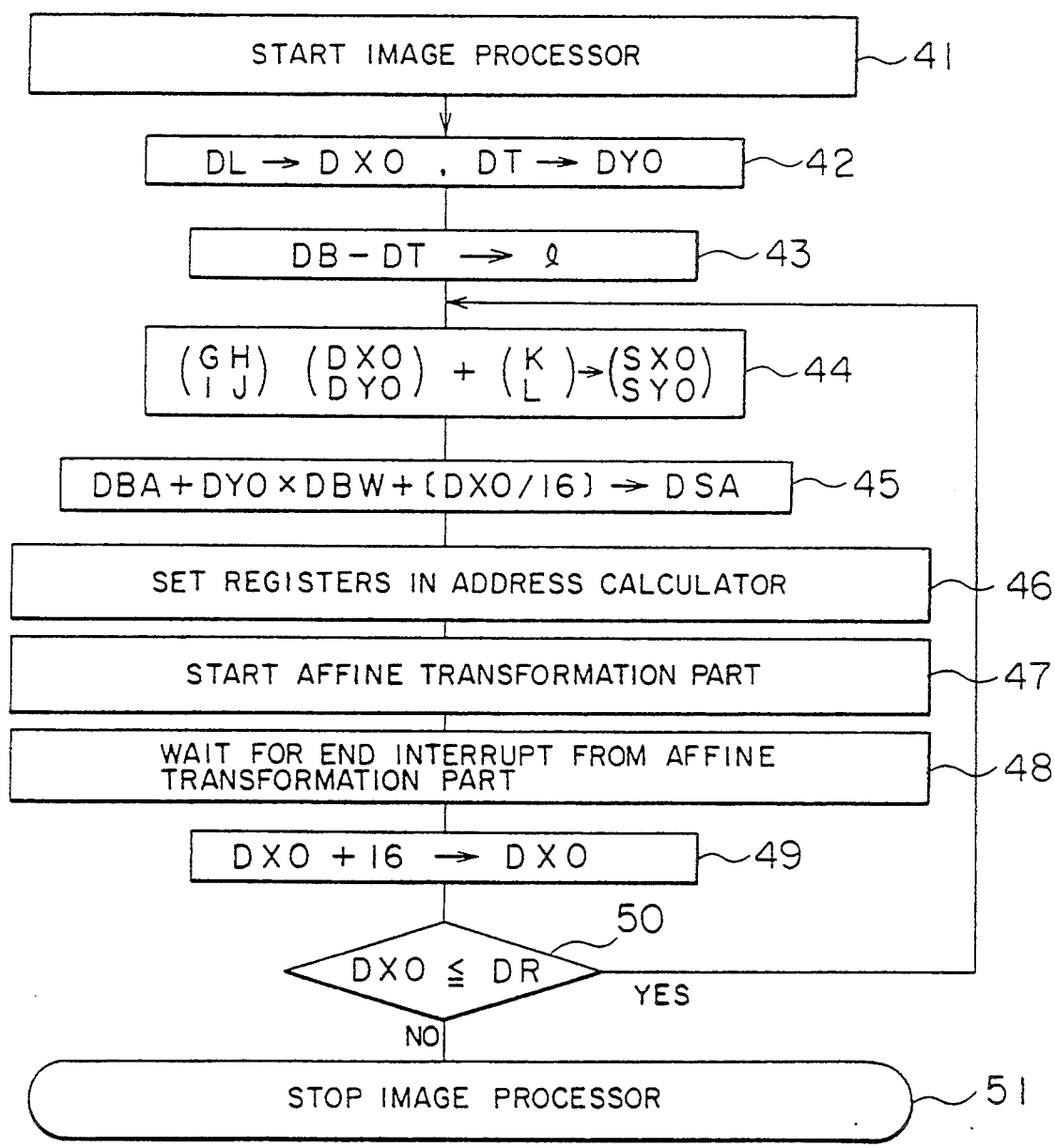
FIG. 5 is a flowchart for explaining the operation of a microprocessor 33 used in the image processor of FIG. 4.
Figure 6:
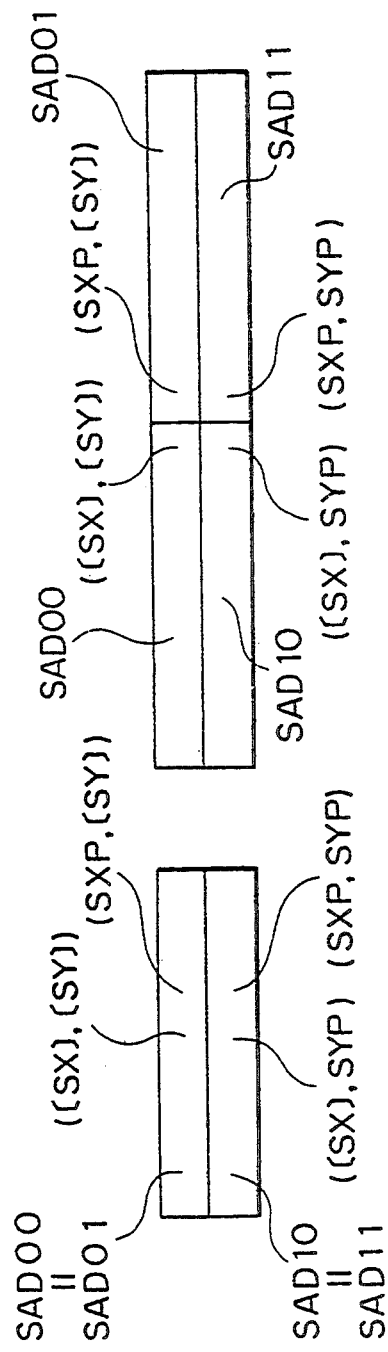
FIGS. 6A and 6B schematically show diagrams for explaining a relationship between four pixels and words containing the four pixels.

Explanation will next be made as to the operation of the microprocessor 33 in FIG. 4 in connection with a flowchart of FIG. 5. First of all, initial parameters sent from a processor (not shown) of the system including the image processor 31 are set to the registers 36 of the image processor 31 to activate the processor 31. The set parameters include G, H, I and J in the affine transformation equation (2), and the parameters SBA, SBW, DBA, DBW, DT, DB, DL and DR shown in FIGS. 2A and 2B. The activation of the processor 31 is designed to start, for example, by making a write access to one of the group of registers 36 as a start register.

When the image processor 31 is activated (step 41), the microprocessor 33 reads the group of registers 36 and calculates values to be set at the registers (which will be explained later) incorporated in the address calculator 32a. The microprocessor 33 first processes the position (DXO, DYO) of a pixel on the destination image when DXO=DL and DYO=DT (step 42), then calculates all line number "−1" (=l) for the destination image processing region in accordance with the equation l=DB−DT (step 43), and finally calculates the position (SXO, SYO) on the source image corresponding to the position (DXO, DYO) on the destination image in accordance with the following equation (3) corresponding to the equation (2) (step 44).

$$\begin{pmatrix} SXO \\ SYO \end{pmatrix} = \begin{pmatrix} G & H \\ I & J \end{pmatrix} \begin{pmatrix} DXO \\ DYO \end{pmatrix} + \begin{pmatrix} K \\ L \end{pmatrix} \qquad (3)$$

Next, the microprocessor 31 calculates the memory address DSA of a word to be firstly processed on the destination image in accordance with the following equation (4).

$$DSA = DBA + DYO \times DBW + [DXO/16] \qquad (4)$$

Subsequently, these values are set to the registers within the address calculator 32a (step 46) to activate the affine transformation part 32 (step 47). The set parameters include SBA, SBW, ST, SB, SL and SR, the x and y coordinate values SXO and SYO at the position to be firstly processed on the source image, the destination base widths DBW, and the image memory address DSA of the word to be firstly processed on the destination image, and the parameter 1. The activation of the affine transformation part 32 is designed to start, for example, when microprocessor 33 makes a write access to a start register provided within the affine transformation part 32.

Thereafter, microprocessor 33 waits for the input of an end interrupt from the affine transformation part 32 (step 48). The microprocessor 33, when receiving the end interrupt, adds 16 to DXO (step 49). This is for the purpose of processing the next area located on the right side of the area 13D by the microprocessor 33, because the affine transformation part 32 only generates an image data corresponding to such an area of 16 pixels (horizontal)×(l+1) pixels (vertical) as shown by the area 13D in FIG. 2B. The microprocessor 33 judges whether or not the next position (DXO, DYO) is located within the destination processing region 15D (step 50). This is attained by comparing DXO with DR, and when a relationship DXO≦DR is satisfied, by determining that the next position is within the region 15D. When the position (DXO, DYO) is within the region 15D, the microprocessor 33 returns to the step 44; when the position is outside the region 15D, the microprocessor 33 stops the image processor (step 51).

Figure 7:
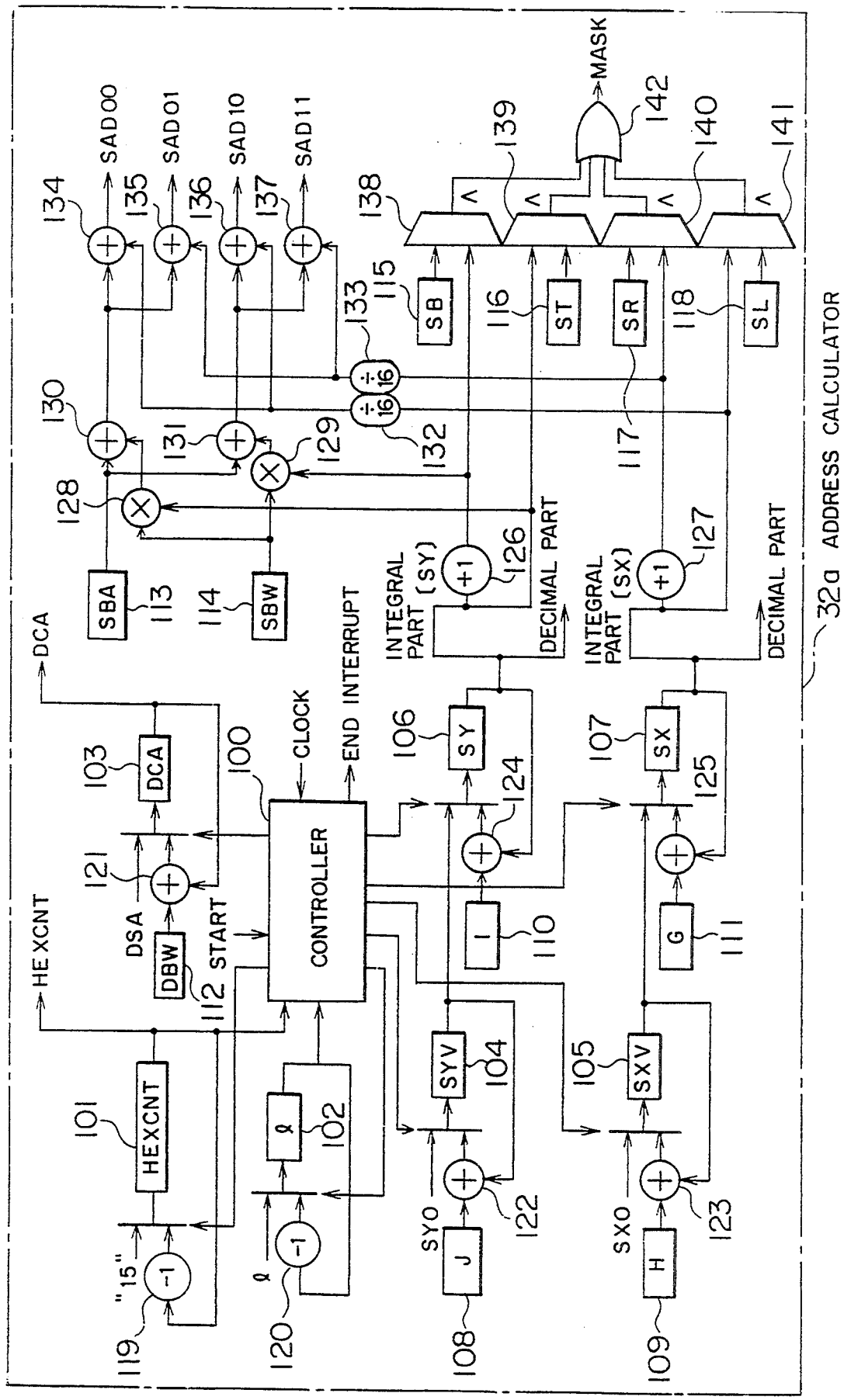
FIG. 7 is a circuit diagram of an embodiment of an address calculator 32a in the image processor of FIG. 4.

The operation of the address calculator 32a will be explained next. FIG. 7 shows a detailed block diagram of the address calculator 32a. In the drawing, reference numerals 101 to 118 denote registers. The microprocessor 33 sets the parameters l, DSA, SYO, SXO, J, H, I, G, DBW, SBA, SBW, SB, ST, SR and SL to the registers 102 to 118 respectively before activating the affine transformation part 32 (step 46). Thereafter, when the affine transformation part 32 is activated, a controller 100 provided in the affine transformation part 32 sets 15 to the HEXCNT register 101, sets values SYV 104 and SYV 105 to the SY and SX registers 106 and 107, and adds J and H to the values of the SYV and SZV registers.

Then, ① the controller 100 subtracts 1 from the value of the HEXCNT register 101 and adds I and G to the values of the SY and SX registers 106 and 107, per one clock.

② When the value of the HEXCNT register 101 becomes zero, the controller 100 sets "15" to the HEXCNT register 101, sets the values of the SYV and SXV registers 104 and 105 to the SY and SX registers 106 and 107, substrates 1 from the value of the l register 102, adds J and H to the values of the SYV and SXV registers, and adds the value of the DBW register 112 to the value of the DCA register 103.

The above procedures ① and ② are repeated until the value of the l register 102 becomes zero and the value of the HEXCNT register 101 becomes zero, at which time the controller 100 generates the end interrupt to the microprocessor 33.

A relationship between the values of the registers and an image will be explained by referring to FIGS. 2A and 2B. The position (SXV, SYV) is a position on the source image corresponding to a left-end pixel in one word of the destination image. The position (SX, SY) is a position on the source image corresponding to the position (DX, DY) whose pixel value is being prepared. The address calculator 32a does not prepare the variables DX and DY, but the position (DX, DY) is shown by means of the DCA register 103 indicative of the memory address of a word containing the associated pixel and the HEXCNT register 101 indicative of the position of the pixel in the word from the right end.

The address calculator 32a also calculates the positions of 4 pixels enclosing the position (SX, SY) and generates the memory addresses of words containing the respective pixels. To this end, the address calculator 32a first calculates integral parts [SX] and [SY] of the parameters SX and SY and calculates values SXP and SYP that correspond to additions of 1 to the values [SX] and [SY]. Of the four pixels enclosing the position (SX, SY), the upper-left pixel has a position of ([SX], [SY]), the upper-right pixel has a position of (SXP, [SY]), the lower-left pixel has a position of ([SX], SYP), and the lower-right pixel has a position of (SXP, SYP) (refer to FIG. 3C). And the respective pixels have image memory addresses SAD00, SAD01, SAD10 and SAD11 which are expressed as follows.

$$\left. \begin{aligned} SAD00 &= [SY] \times SBW + [[SX]/16] + SBA \\ SAD01 &= [SY] \times SBW + [SXP/16] + SBA \\ SAD10 &= SYP \times SBW + [[SX]/16] + SBA \\ SAD11 &= SYP \times SBW + [SXP/16] + SBA \end{aligned} \right\} \qquad (5)$$

The address calculator 32a also generates the flag MASK which is set at "1" when any of these four pixels is located outside the source image processing region 15S. The flag MASK is expressed by the following logical expression (6).

$$MASK = (SYP > SB) + ([SY] < ST) + (SYP > SR) + ([SX] < SL) \qquad (6)$$

Thus, the flag is generated by means of comparators 138, 139, 140 and 141 for comparison between SYP and SB, [SY]0 and ST, SXP and SR, and [SX] and SL, and also by means of an OR gate 142.

Figure 8:
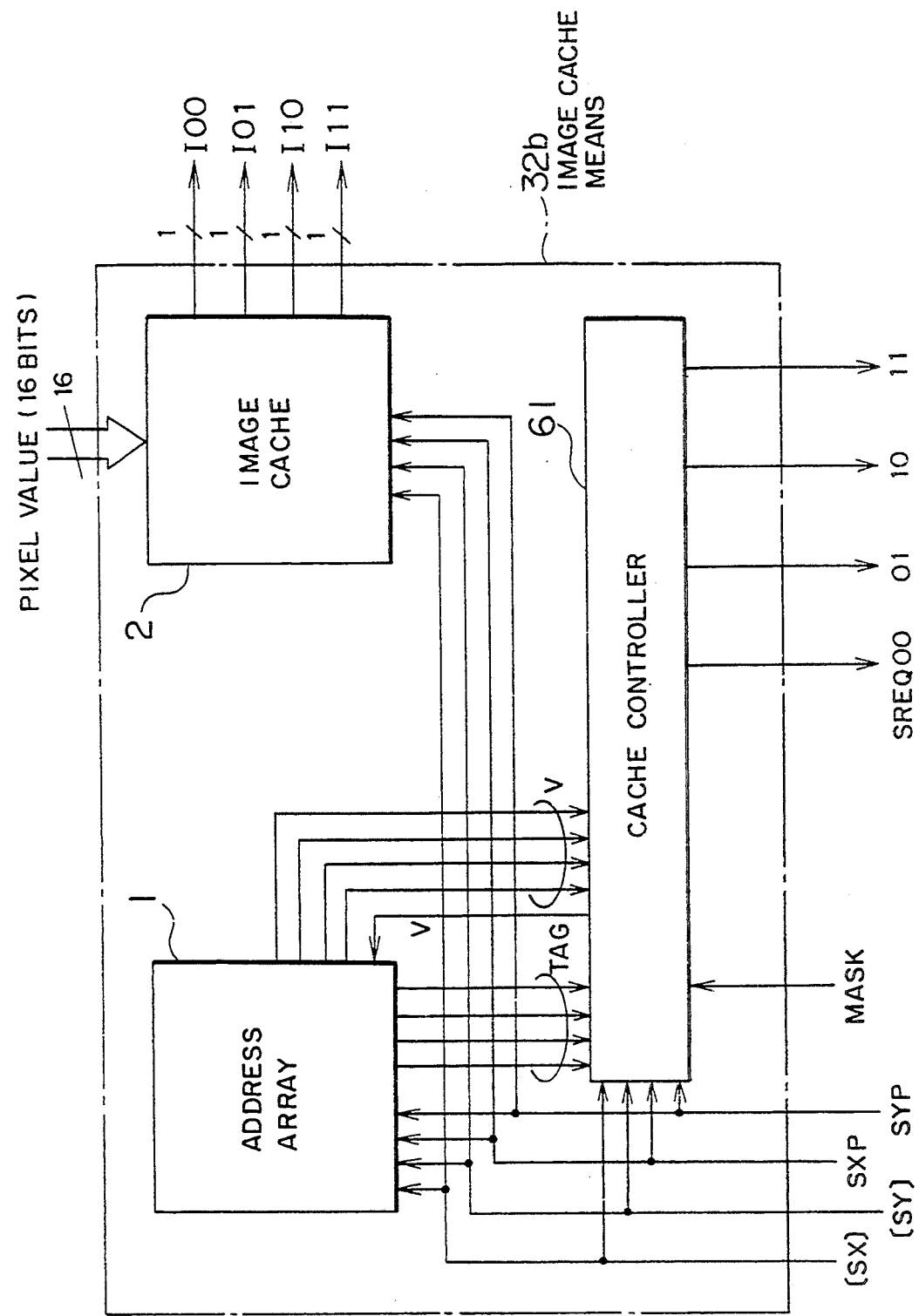
FIG. 8 is a block diagram of an embodiment of an image cache means 32b in the image processor of FIG. 4.

The operation of the image cache means 32b will next be described with reference to FIG. 8, FIG. 9, and FIGS. 1A and 1B. In FIG. 8 and FIGS. 1A and 1B, the image cache means 32b includes an image cache 2 which comprises 64×64 bit registers and which can take pixel values corresponding to 64 pixels×64 pixels therein. An address array 1, which is also included in the image cache means 32b, comprises 64×4 tags and V (valid) bits, each tag and each V bit corresponding to an area of 16 bits (horizontal) ×1 bit (vertical) in the image cache 2. The following values are sent from the address calculator 32a (refer to FIG. 4) to the image cache means 32b (refer to FIG. 3C).

[SX]: Source image x address integral part
[SY]: Source image y address integral part
SXP: [SX]+1
SYP: [SY]+1
MASK: Flag to be set when any of the four pixels surrounding the position (SX, SY) on the source image is located outside the source image processing region.

A cache controller 61 in FIG. 8 is provided to judge whether the pixels ([SX], [SY]), (SXP, [SY]), ([SX], SYP), (SXP, SYP) are concurrently written in the image cache 2 (which operation will be referred to as the hit test, hereinafter).

Explanation will then be made as to the operation of the image cache means 32b for one pixel in connection with FIG. 9. In the present embodiment, the following operations are carried out at the same time with respect to 4 pixels. That is, the image cache means 32b, after being activated, clears all V bits (operation 72 in FIG. 9) and waits for the input of a cache read request (operation 73). The image cache means 32b, when receiving the cache read request, performs the hit test (operation 74). When the test is determined to be a hit, the image cache means 32b performs a cache read operation (operation 75) and returns to the cache read request wait mode (operation 73). When the test is determined to be a cache mishit, the image cache means 32b takes pixel values corresponding to one word into the image cache 2 from an image memory (not shown), writes the corresponding tag, sets the V bit (operation 76), and then returns to the hit test mode (operation 74).

In order to read out the pixel values corresponding to one word from the image memory, the image cache means 32b issues a read request to the read request arbiter 32d. The read request arbiter 32d, when accepting the read request, activates the read cycle of the image memory bus controller 35 to read the word from the image memory. When two or more erroneous pixels take place at the same time, the image cache means 32b issues two or more read requests, but the read request arbiter 32d sequentially accepts these read requests. In the cache read request wait mode 73, if the image cache means 32b receives the end request, then the means 32b is immediately terminated (operation 77).

The hit test method of the image cache 2 will be explained in connection with FIG. 1A. A single tag 4 and a single V bit 5 are designated respectively by an x address of $2^4$-$3^5$ bits and a y address of $2^0$-$2^5$, and the value of tag 4 is compared at a comparator CMP 7 with an x address of $2^6$-$2^{12}$ and a y address of $2^6$-$2^{12}$. When the comparator 7 finds a coincidence therebetween and the V bit is "1", the image cache 2 determines to be an image cache hit and an AND circuit 8 outputs "1", so that a bit 6 designated by an x address of the image cache 2 of $2^0$-$2^5$ and a y address of $2^0$-$2^5$ becomes valid. If not, the image cache 2 issues an image memory read request.

How to write pixel values from the image memory to the image cache 2 will be explained by referring to FIG. 1B. Pixel values corresponding to one word read out from the image memory are written into a 16-bit zone 9 represented by x addresses of $2^4$-$2^5$ bits and y addresses of $2^0$-$2^5$ bits and y addresses of $2^0$-$2^5$ bits on the image cache 2. Simultaneously with this operation, the x address of $2^6$-$2^{12}$ bits and the y address of $2^6$-$2^{12}$ bits are written into the tag 4 represented by the x address of $2^4$-$2^5$ bits and the y address of $2^0$-$2^5$ bits and corresponding V bit 5 is set.

Figure 10:
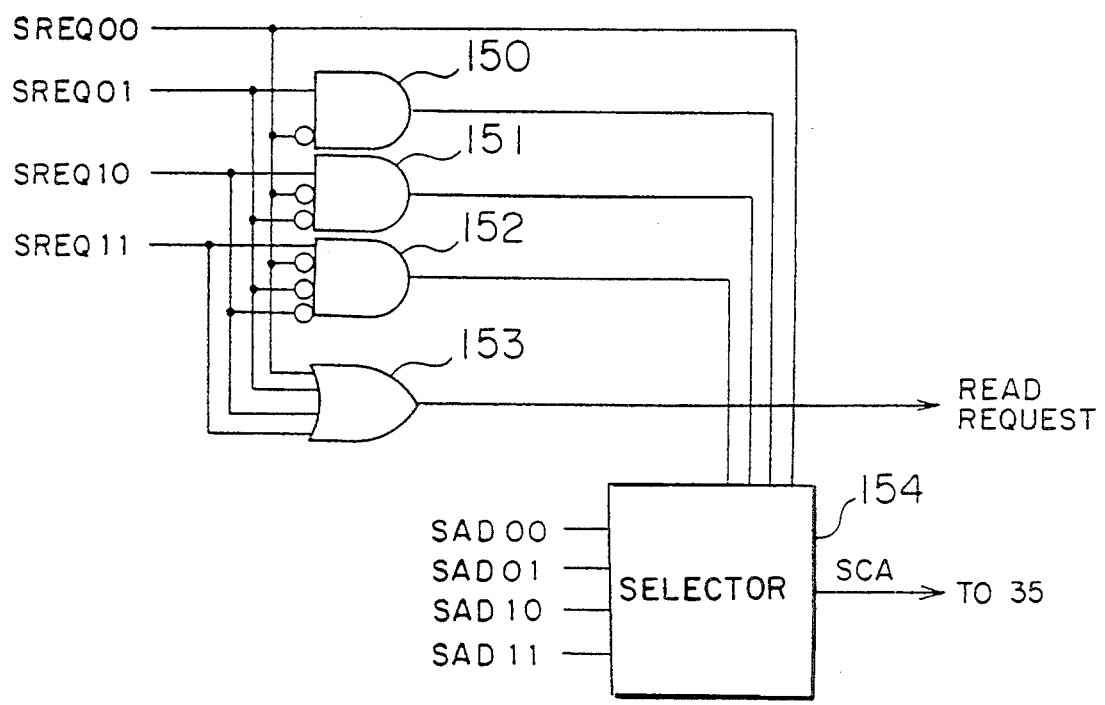
FIG. 10 is a circuit diagram of an embodiment of a read request arbiter 32a in the image processor 31 of FIG. 4.

Explanation will next be directed to the operation of the read request arbiter 32d with reference to FIG. 10. A reference numeral 153 denotes an OR gate which issues a read request to the image memory bus controller 35 when the cache controller 61 (refer to FIG. 8) of the image cache means 32b issues at least one of the read requests SREQ00, SREQ01, SREQ10 and SREQ11 for words containing the upper-left, upper-right, lower-left and lower-right pixels. Numerals 150 to 152 denote AND gates. Outputs of the gates 150, 151 and 152 are obtained by suppressing the read request SREQ01 with the request SREQ00, suppressing the request SREQ10 with the requests SREQ00 and SREQ01, and suppressing the request SREQ11 with requests SREQ00, SREQ01 AND SREQ10, respectively. As a result, the gates 150 to 152 form a priority judging circuit. That is, the signal SREQ00 and the outputs of the gates 150 to 152 are arranged so that the priorities of the signals SREQ00, SREQ01, SREQ10 AND SREQ11 are set to be lower in this order, and only the read request having the highest priority is issued. A selector 154 functions to select one of memory addresses SAD00, SAD01, SAD10 and SAD11 for the words containing the upper-left, upper-right, lower-left and lower-right pixels on the basis of the above four input signals and outputs the selected memory address SCA to the image memory bus controller 35.

Figure 11:
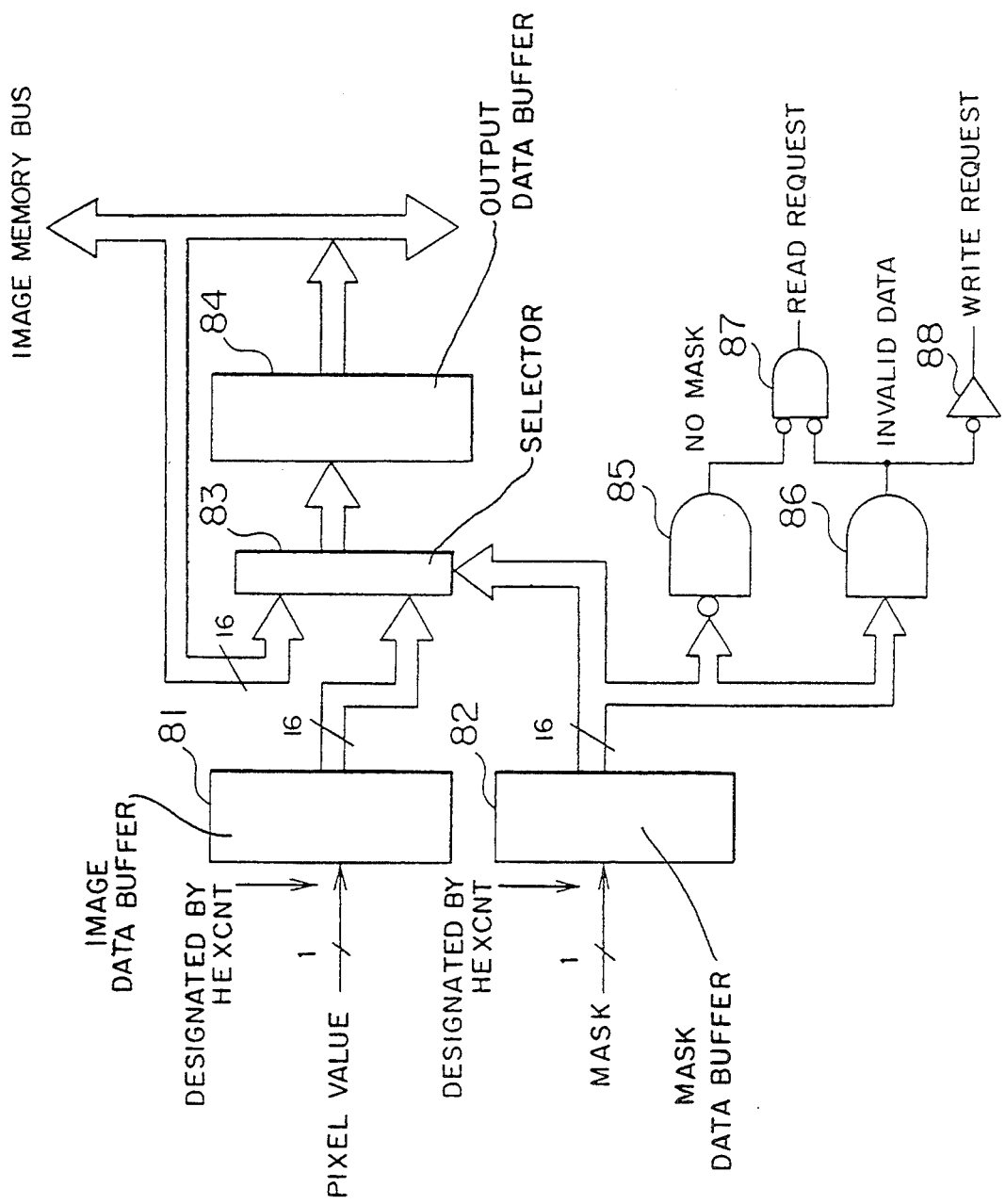
FIG. 11 is a circuit diagram of an embodiment of an output data buffer means in the image processor of FIG. 4.

Next, the operation of the output buffer means 34 will be detailed by referring to FIG. 11. In the drawing, an image data buffer 81 comprises a 16-bit register which latches a pixel value sequentially sent on pixel-after-pixel basis from the interpolation calculator 32c at the bit position indicated by the HEXCNT register of the address calculator 32a. A mask data buffer 82, which comprises a 16-bit register, latches a mask data sequentially sent on pixel-after-pixel basis from the address calculator 32a at the bit position designated by the HEXCNT register of the address calculator 32a. A selector 83 is provided to select one of the output of the image data buffer 81 and the image memory read data on the basis of the value of the output of the mask data buffer 82. An output data buffer 84 latches the output of the selector 83. A gate 85 generates a control signal which is set at "1" only when all the bits of the mask data buffer 82 are zero. A gate 86 generates another control signal which is set at "1" only when all the bits of the mask data buffer 82 are "1". A gate 87 generates an image memory read request signal for read modify write on the basis of the outputs of the gates 85 and 86 while an inverter 88 generates an image memory write request signal on the basis of the output of the gate 86.

Figure 12:
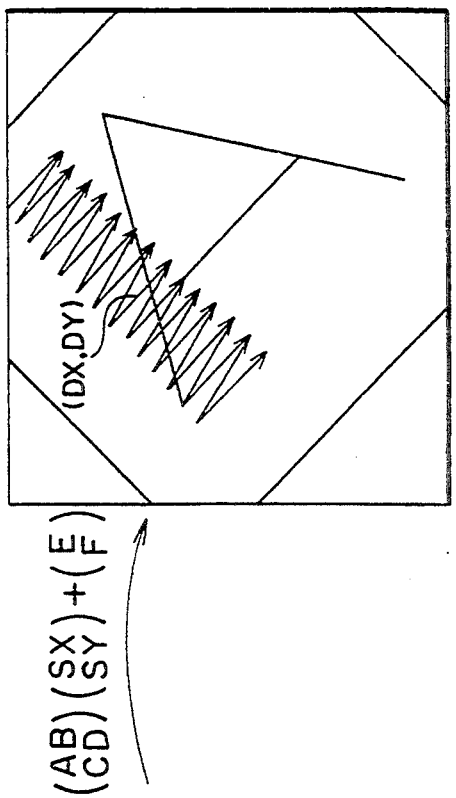
FIGS. 12A and 12B schematically show diagrams for explaining how to transform an image in accordance with a second embodiment of the present invention.

Explanation will be made as to a second embodiment of the present invention by referring to FIGS. 12 to 17. In the present embodiment, as shown in FIGS. 12A and 12B, the transformation of a position (SX, SY) on a source image to a position (DX, DY) on a destination image is carried out in accordance with the aforementioned equation (1). More specifically, the position (DX, DY) on the destination image corresponding to the position (SX, SY) on the source image is calculated in accordance with the equation (1), and a pixel value at the position (SX, SY) on the source image is set as a pixel value nearest to the position (DX, DY) on the destination image. The x and y addresses of the pixel nearest to the position (DX, DY) on the destination image can be easily obtained by calculating the parameters DX and DY in accordance with the following equation (7) and taking the integral parts of the parameters DX and DY.

$$\begin{pmatrix} DX \\ DY \end{pmatrix} = \begin{pmatrix} A & B \\ C & D \end{pmatrix} \begin{pmatrix} SX \\ SY \end{pmatrix} + \begin{pmatrix} E + 0.5 \\ F + 0.5 \end{pmatrix} \quad (7)$$

The region into which the destination image is to be written includes the following characteristics: source and destination image processing regions are both designated as rectangular regions parallel to x and y axes; a position ([DX], [DY]) on the destination image after the calculation of the DX and DY from the equation (7) is located within the destination image processing region and, the position (SX, SY) on the source image is located within the source image processing region. The structure of a memory used in the present embodiment is the same as that of the memory in the first embodiment.

Figure 13:
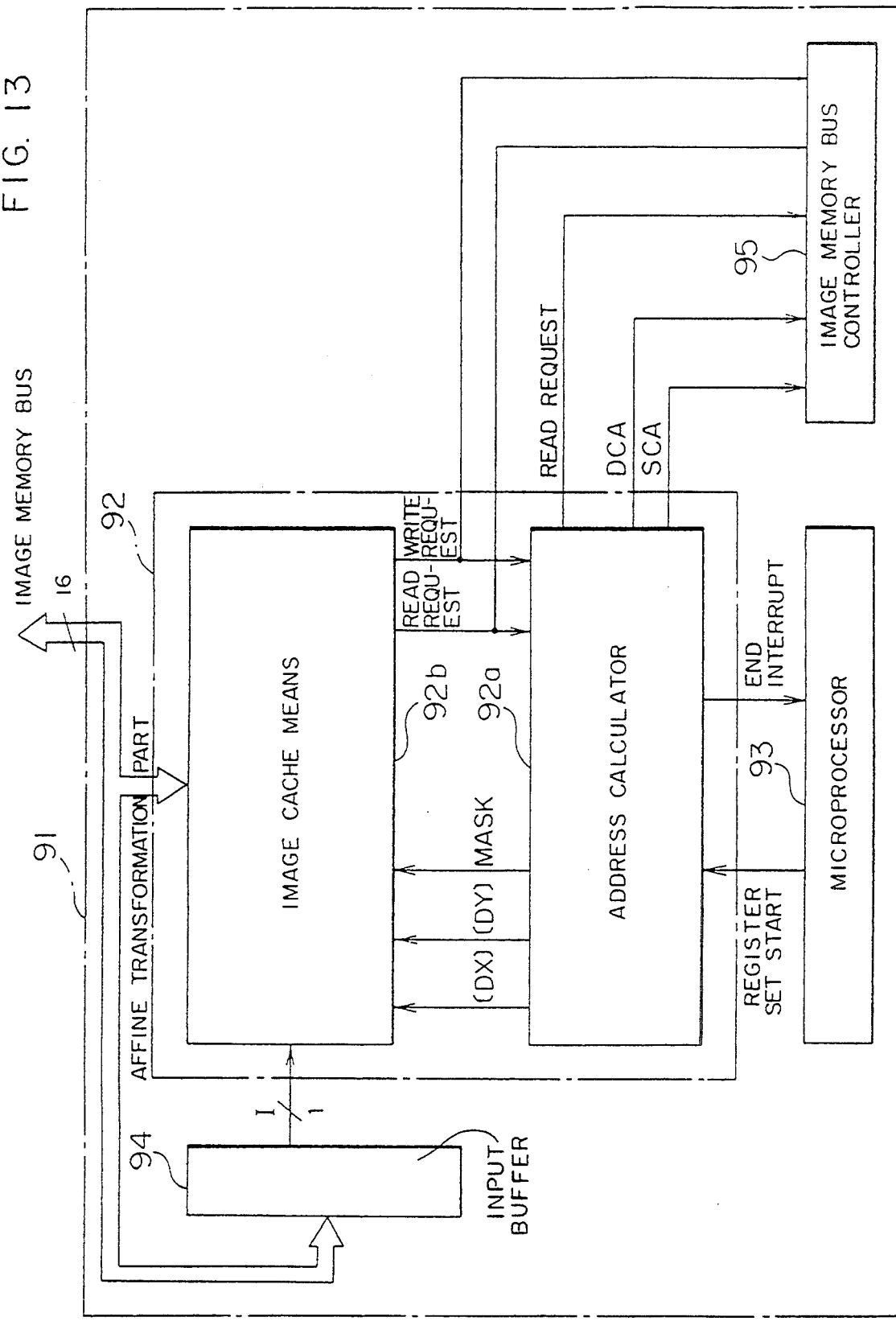
FIG. 13 is a block diagram of an embodiment of an image processor in accordance with the second embodiment of the present invention.

An image processor realizing the present embodiment is shown, in a block diagram, by reference numeral 91 in FIG. 13. An affine transformation part 92 included in the image processor 91, when activated by a microprocessor 93, transforms an image of a size corresponding to 16 pixels (horizontal)×1 pixels (vertical) (where 1 is a set value issued from the microprocessor 93). In the present embodiment, to this end, in order to transform an image of a size corresponding to several words in the horizontal direction, the microprocessor 93 activates the affine transformation parts 92 several times. An image memory bus controller 95 arbitrates between a source image data read request from an address calculator 92a, a data read request to a destination image region and a destination image data write request from an image cache means 92b. An input buffer means 94 accumulates pixel values corresponding to one word read from an image memory (not shown) and sends them to the affine transformation part 92 on a pixel-after-pixel basis.

The address calculator 92a provided in the affine transformation part 92 scans the x and y address SX and SY of the source image and generates x and y addresses DX and DY for the corresponding destination image, an image memory address DCA for the word containing a position ([DX], [DY]) on the destination image, an image memory address SCA for the word containing a position (SX, SY) on the source image, and a flag MASK which is set at "1" when the position ([DX], [DY]) on the destination image is located outside the destination image processing region. The image cache means 92b writes the generated destination image into an image cache 2 incorporated therein and then writes it into the image memory on a swap-out cache basis.

Figure 14:
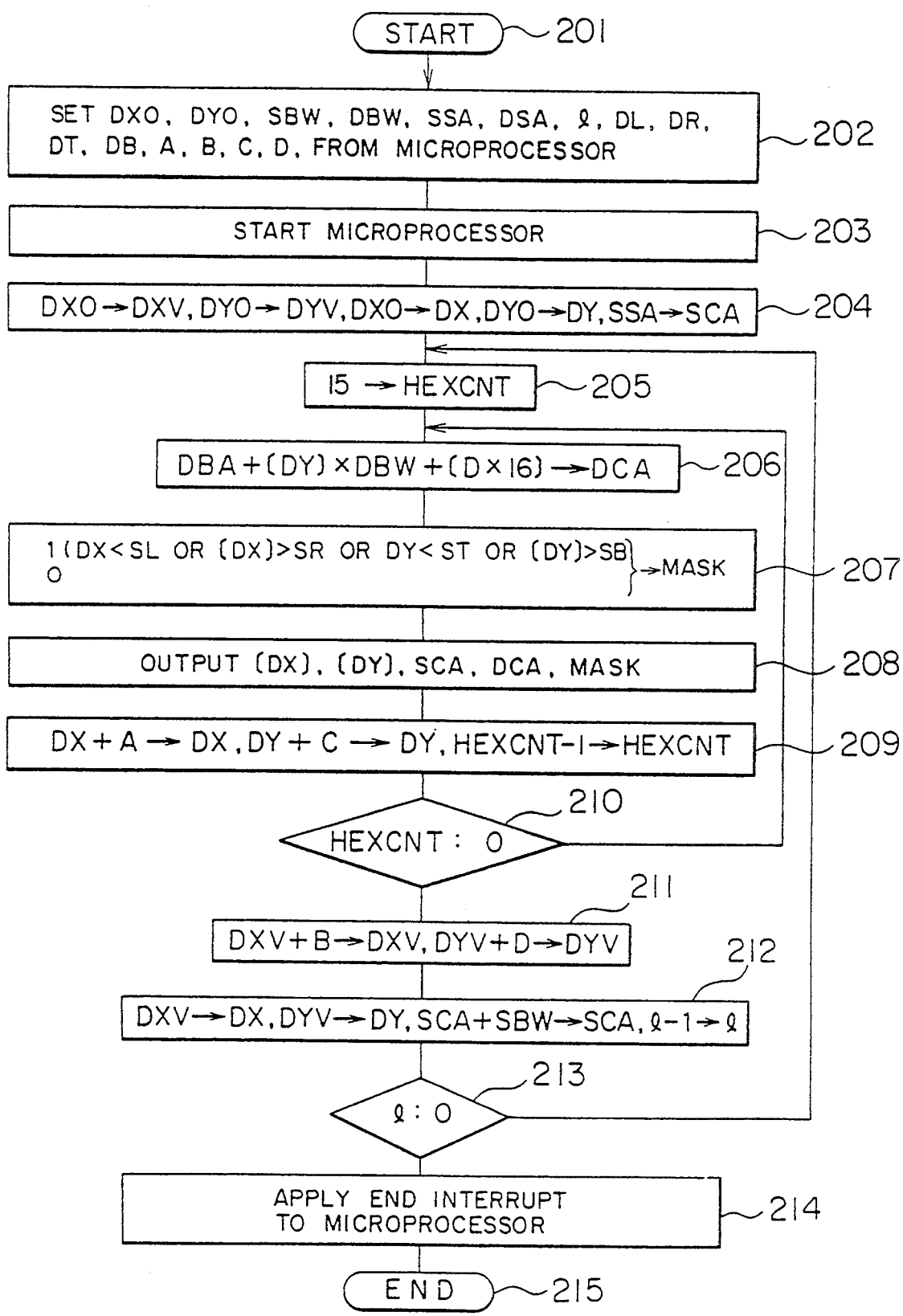
FIG. 14 is a flowchart for explaining the operation of a microprocessor 93 in the image processor of FIG. 13.

Next, the operation of the address calculator 92a will be explained by referring to FIG. 14. In the present embodiment, the address calculator 92a may be arranged as in the foregoing embodiment, but the address calculator 92a will be explained in connection with an embodiment where the address calculator 92a is executed in accordance with a program under control of a CPU or the like. In a step 202 of FIG. 14, the microprocessor 93 sets the following values to the registers of the address calculator 92a.

DXO: X start address of destination image
DYO: Y start address of destination image
SBW: Source image base width
DBW: Destination image base width
SSA: source image memory start address
DSA: Destination image memory start address
l: source image processing line number −1
DL: Left-end x address of destination image processing region
DR: Right-end x address of destination image processing region
DT: Upper-end y address of destination image processing region
DB: Lower-end y address of destination image processing region
A, B, C, D: Parameters in the equation (1)

Thereafter, the address calculator 92a, when activated by the microprocessor 93 (step 203), starts its operation. In a step 204, values DXV, DYV, DX, DY and SCA are initialized, where DXV and DYV are work variables. In a step 205, the variable HEXCNT for counting the number of processing pixels is initialized for processing of one word (16 pixels) of the source image. In a step 206, the image memory address of the word containing the position ([DX], [DY]) is set at the DCA register. In a step 207, when the position ([DX], [DY]) is located outside the destination image processing region, the flag MASK is set at "1". In a step 208, the address calculator 92a outputs the signal [DX], [DY], SCA, DCA and MASK. In a step 209, a position (DX+A, DY+C) on the destination image corresponding to a position (SX+I, SY) located on the right side of the processing position (SX, SY) on the source image is set as a new position (DX, DY). At the end of a loop from the step 206 to a step 210, one-word processing is completed.

In a step 211, a position (DXV+B, DYV+D) on the destination image corresponding to a left-end dot in a word on the next line of the source image is set as a new position (DXV, DYV). In a step 212, the values DXV and DYV are used as new values DX and DY. An image memory address for the word located one line below the processing word in the source image is used as a new SCA. At the end of a loop from the step 205 to a step 213, processing of one horizontal word (16 pixels) and l vertical lines in the source image is completed.

Figure 15:
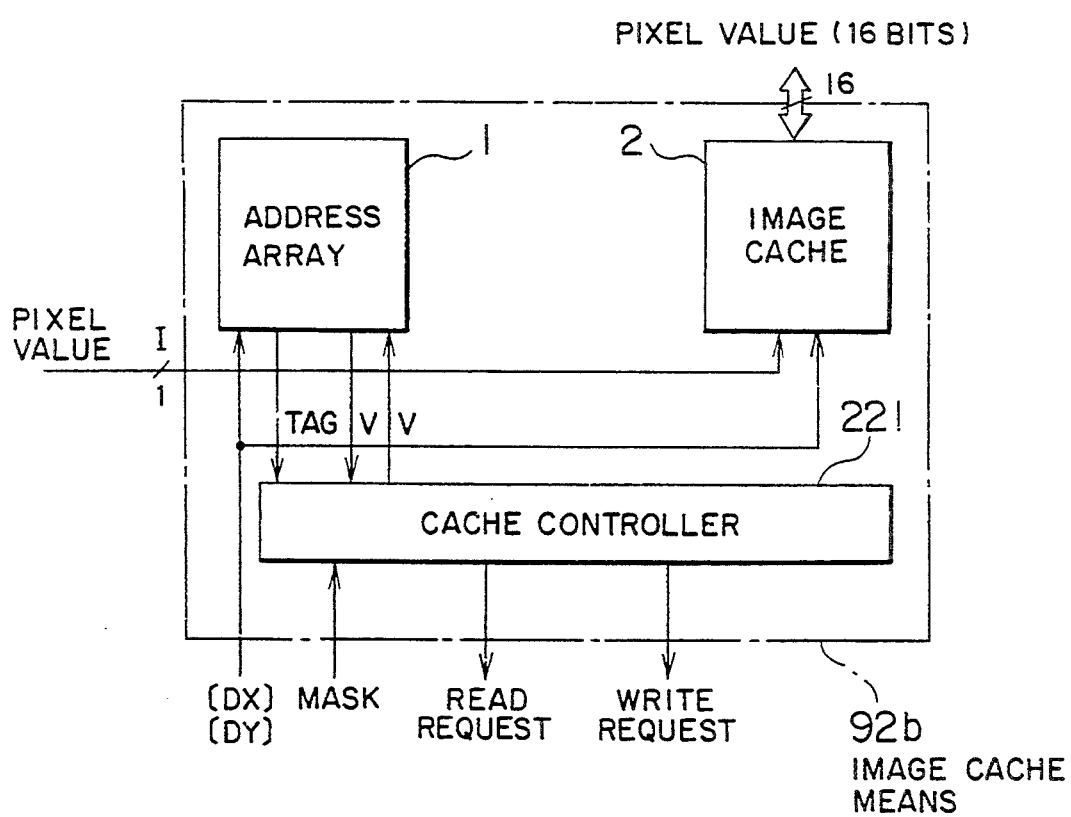
FIG. 15 is a block diagram of an embodiment of an image cache means 92b in the image processor of FIG. 13.
Figure 16:
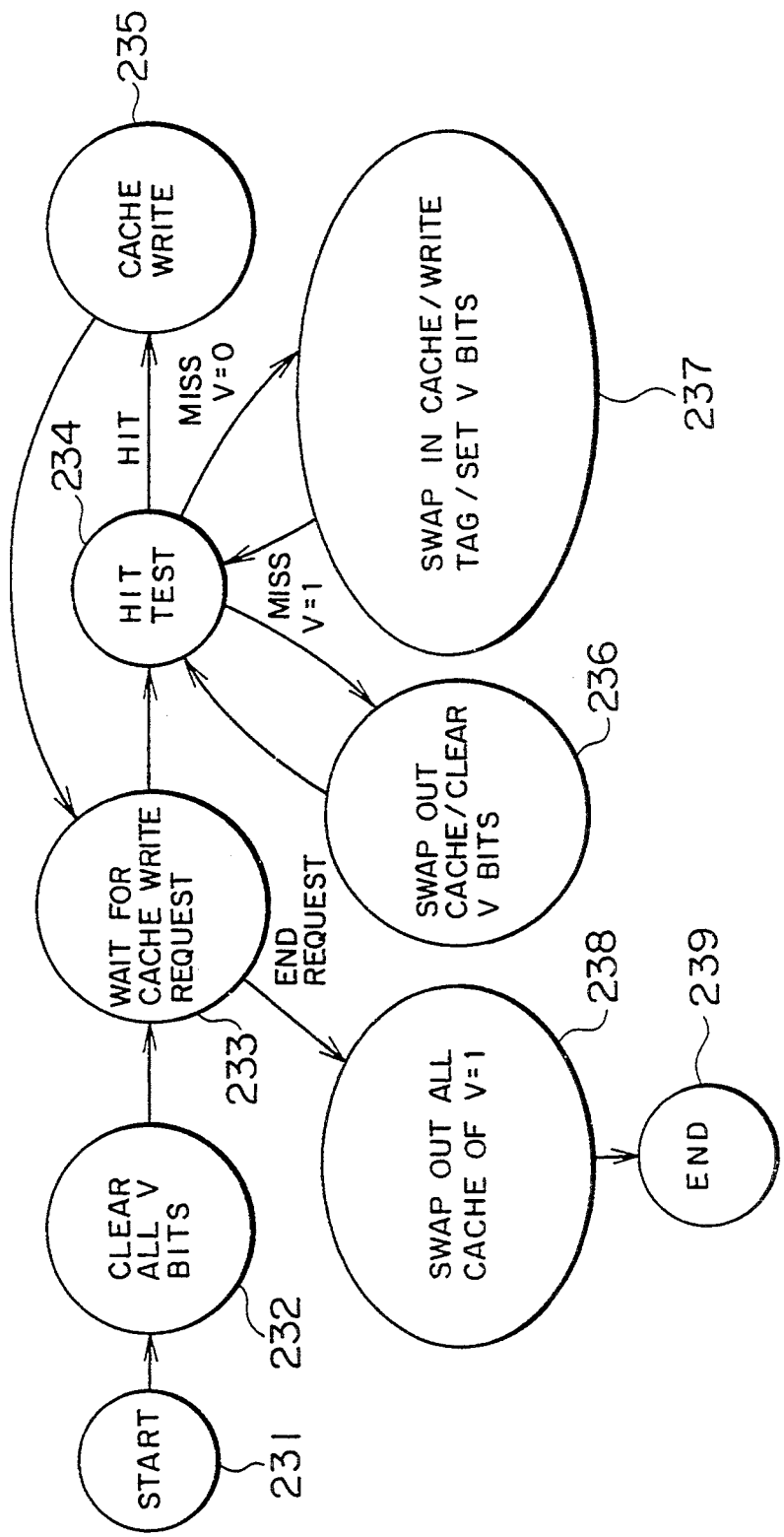
FIG. 16 is a transit status diagram for explaining the operation of the image cache means 92b of FIG. 15.
Figure 17A:
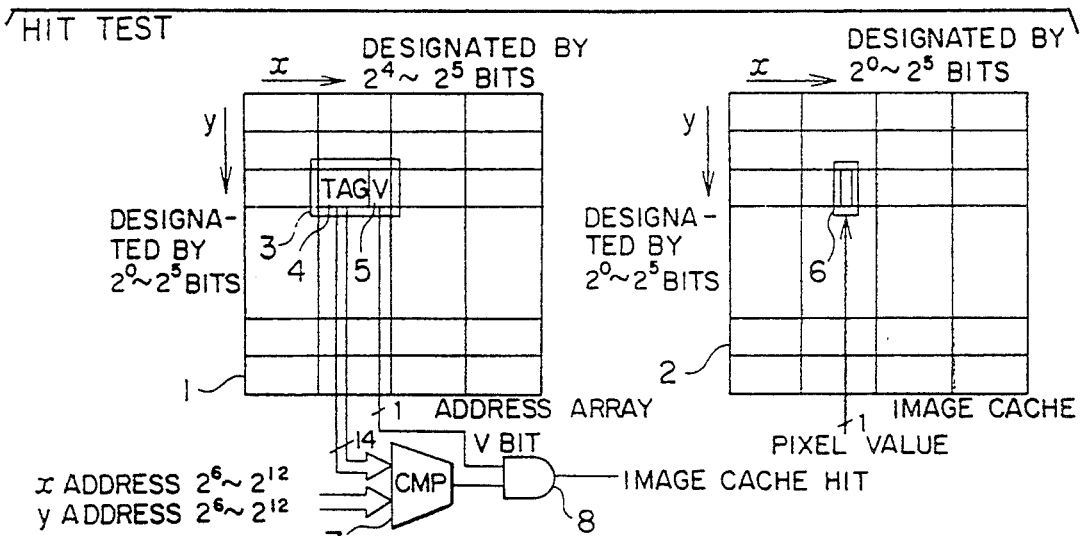
FIG. 17A to 17C schematically show diagrams for explaining the operation of the image cache means of FIG. 15.
Figure 17B:
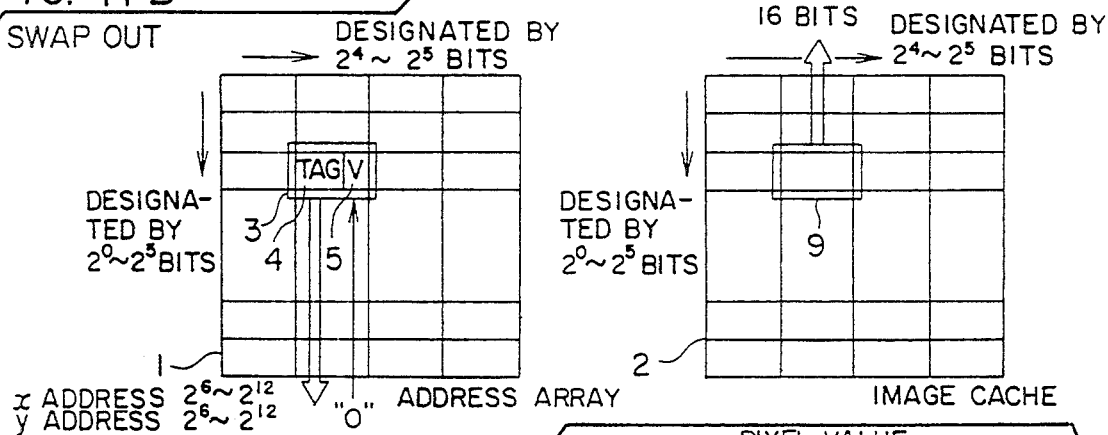
Figure 17C:
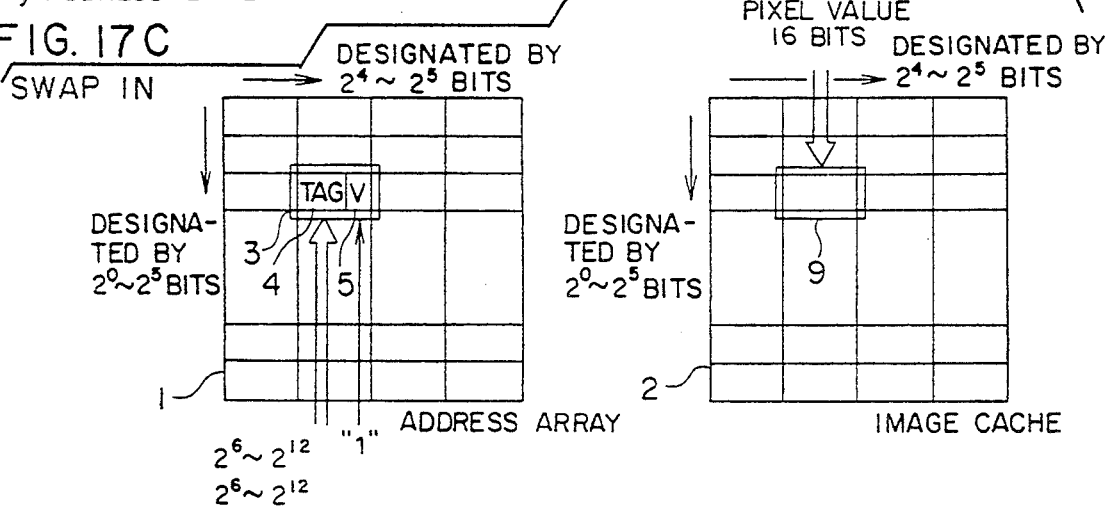

Explanation will then be made as to the image cache means 92b by referring to FIGS. 15 to 17. The image cache 2 in FIGS. 15, 17A, 17B and 17C, which comprises a 64×64 bit register can take pixel values for 64×64 pixels. The address array 1 comprises a total of 64×4 tags and V bits, each tag and each V bit corresponding to a zone of the image cache 2 corresponding to 16 bits (horizontal)×1 bit (vertical). The following values are provided from the address calculator 92a to the image cache means 92b.

[DX]: address integral part of destination image
[DY]: Y address integral part of destination image
MASK: Flag which is set at "1" when the position ([DX], [DY]) on the destination image is located outside the destination image processing region
I: Pixel value for the position (SX, SY) on the source image A cache controller 221 in FIG. 15 performs a so-called hit test, that is, judges whether or not the word containing the position ([DX], [DY]) is written into the image cache 2 from the image memory (not shown).

The operation of the image cache means 92b will then be explained in connection with FIG. 16. The image cache means 92b, when activated, clears all the V bits (stage 232 in FIG. 16) and waits for the input of a cache write request (stage 233). When receiving the cache write request, the image cache means 92b performs the hit test (stage 234). In the case of a cache hit, the image cache means writes the pixel value I into the cache (stage 235) and returns to the stage 233 to wait for the input of the next cache write request. In the case of a cache mishit and V=0, pixel values corresponding to one word are read out from the image memory and written into the cache, the corresponding tag is written, the V bits are set (stage 237), and control is returned to the stage 234. In the case of a cache mishit and V=1, pixel values corresponding to one word of the cache are swapped out into the image memory, the V bits are cleared (stage 236), and control is returned to the hit test stage 234. In the cache write request wait stage, when the image cache means 92b receives and end request, all the pixel values of the image cache corresponding to the set V bits are swapped out into the image memory (stage 238), and then the processing of the image cache means is terminated (stage 239).

Explanation will be made as to how the image cache performs the hit test with reference to FIG. 17A. First, a tag 4 and a V bit 5 are designated respectively in terms of an x address of $2^4$-$2^5$ bits and a y address of $2^0$-$2^5$ bits. The value of the tag is compared at a comparator 7 with x addresses of $2^6$-$2^{12}$ bits and y addresses of $2^6$-$2^{12}$ bits. If a coincidence is found at the comparator and the V bit is "1", then a cache hit is determined, and the pixel value I is written at a position of the image cache specified by an x address of $2^0$-$2^5$ bits and a y address of $2^0$-$2^5$ bits.

Explanation will next be made as to swap out pixel values corresponding to one word from the image cache to the image memory by referring to FIG. 17B. When a cache mishit is determined and V=1, a pixel values 9 of the corresponding one word of the image cache 2 are written to the word addressed by X and Y addresses defined as follows. An x address of $2^4$-$2^5$ bits and a y address of $2^0$-$2^5$ on the image memory are equal to DX of $2^4$-$2^5$ bits and DY of $2^0$-$2^5$ respectively, and the x addresses of $2^6$-$2^{12}$ bits and the y addresses of $2^6$-$2^{12}$ bits are equal to the tag designated by the DX of $2^4$-$2^5$ bits and the DY of $2^0$-$2^5$ bits. Simultaneosuly with the writing into the word designated by the image memory address corresponding to the image logical address, the corresponding V bit 5 is lowered.

How to write a word from the image memory into the image cache will be explained by referring to FIG. 17C. Pixel values corresponding to one word read from the image memory are written into the 16-bit zone 9 designated by the x address of $2^4$-$2^5$ bits and the y address of $2^0$-$2^5$ bits on the image cache. Simultaneously with this writing operation, the x address of $2^6$-$2^{12}$ bits and the y address of $2^6$-$2^{12}$ bits are written into the corresponding tag 4 to set the V bit 5.

Turning again to FIG. 13, the input buffer means 94, which comprises 16-bit registers, reads a source image data corresponding to one word from the image memory. Thereafter, the address calculator 92a outputs the bit contents designated by the HEXCNT register provided therein.

Although the image processor has performed the affine transformation in the foregoing embodiments, the image processor may perform nonlinear transformation, including the following transformation.

$$\left. \begin{array}{l} SX + mDX^2 + nDX \cdot DY + oDY^2 + pDX + qDY + r \\ SY = sDX^2 + tDX \cdot DY + uDY^2 + vDX + wDY + z \end{array} \right\} \quad (8)$$

It goes without saying that the transformation from (SX, SY) to (DX, DY) corresponds to an inverse transformation of the transformation shown by the equation (8).

As has been disclosed in the foregoing, in accordance with the present invention, the use of the x and y addresses of an image in the cache control enables the distance between pixels belonging to the same entry to be increased. As a result, a cache hit rate can be made large by sequentially processing pixels located closely on the image, and thus the entire processing speed of the system can be increased.

Further, in the event where the cache is made up of registers provided within the image processor, high speed processing can be attained even when access to the cache is carried out on a pixel-after-pixel basis.

Furthermore, the use of the affine transformation in the interior processing of the image processor can make the most of the features of the cache and thus can realize the high speed processing.

What is claimed is:

1. An image data processing system for performing coordinate transformation about a pixel position of image data between source image data and destination image data, comprising:

image memory means for storing the source and destination image data; and an image data processor for transforming the source image data stored in the image memory means and storing the transformed data into the image memory means, the image data processor comprising:

coordinate calculating means for scanning a pixel position represented by DX and DY in a destination image, and calculating a memory address of said pixel position in the destination image, a pixel position represented by SX and SY in a source image which is to be transferred to said pixel position in the destination image by a transformation process, and a memory address of said pixel position in the source image;

cache memory means for storing the source image data read from said memory address of said pixel position in the source image calculated by the coordinate calculating means with said pixel position represented by SX and SY in the source image;

data write control means for writing the image data into the memory address of said pixel position in the destination image calculated by said coordinate calculating means; and cache control means for controlling the cache memory means so that if the source image data at said pixel position in the source image which is to be transferred to said pixel position in the destination image has already been stored in the cache memory means, the source image data is read from the cache memory means in response to said pixel position represented by SX and SY in the source image, and used to make the destination image.

2. An image data processing system for performing coordinate transformation about a pixel position of image data between source image data and destination image data, comprising:

image memory means for storing the source and destination image data; and an image data processor for transforming the source image data stored in the image memory and storing the transformed data into the image memory means, the image data processor comprising:

data read control means for controlling the image memory means so that the source image data is read from the image memory means in response to a memory address;

coordinate calculating means for scanning a pixel position in a source image, and calculating a memory address of said pixel position represented by SX and SY in the source image, a pixel position in a destination image represented by DX and DY to which said pixel position in the source image is to be transferred by a transformation process, and a memory address of said pixel position in the destination image;

cache memory means for storing the destination image data which are to be written into the image memory means at said memory address of said pixel position in the destination image calculated by the coordinate calculating means, storing with said pixel position represented by DX and DY in the destination image; and cache memory control means for controlling the cache memory so that, if old data before updating the image memory means represented by the DX and DY of the destination image where new data to be written into the image memory means is present in the cache memory means, the old data is updated with image data newly written into the cache memory means, if old data represented by DX and DY of the destination image where new data to be written into the image memory means is not present in the cache memory means, the image data which is to be newly written into the image memory means is newly stored into the cache memory means with the coordinate values DX and DY, but before updating the cache memory means, if old different coordinate values and data for writing into different coordinate values are already present in the newly stored position of the cache memory means, the old values already present are written into a position pointed to by said different coordinate values before updating the cache memory means with new coordinate values and new data, and when finishing a coordinate transformation from the source image to the destination image, all data in the cache memory means but not yet written into the image memory means are written into the image memory means.

3. An image data processing method of performing coordinate transformation about a pixel position of image data between source image data and destination image data, comprising the steps of:

scanning a pixel position represented by DX and DY in a destination image, and calculating a memory address of said pixel position in the destination image, a pixel position represented by SX and SY in a source image which is to be transferred to said pixel position in the destination image by a transformation process, and a memory address of said pixel position in the source image;

storing the source image data read from said memory address of said pixel position in the source image into a cache memory means with said pixel position represented by SX and SY in the source image;

writing the image data into the memory address of said pixel position in the destination image; and if source image data at said pixel position in the source image which is to be transferred to said pixel position in the destination image has already been stored in the cache memory means, reading the source image data from the cache memory means in response to said pixel position represented by SX and SY in the source image, and using it to generate a destination data, and if the source image data at said pixel position in the source image which is to be transferred to said pixel position in the destination image has not yet been stored in the cache memory means, reading the source image data from the image memory means, writing it into the cache memory means, and using it to generate the destination data.

4. An image data processing method of performing coordinate transformation about a pixel position of image data between source image data and destination image data, comprising the steps of:

scanning a pixel position represented by SX and SY in the source image, and calculating a memory address of said pixel position in the source image, a pixel position represented by DX and DY in the destination image to which said pixel position in the source image is to be transferred by a transformation process, and a memory address of said pixel position in the destination image;

reading the source image data from an image memory means in response to the memory address of said pixel position in the source image;

storing the destination image data which are to be written into the image memory means into a cache memory means, storing with said pixel position represented by DX and DY in the destination image; and if old data before updating the image memory represented by DX and DY of the destination image where new data to be written into the image memory means is present in the cache memory means, updating old data with image data newly written into the cache memory means, if old data represented by DX and DY of the destination image where new data to be written into the image memory means is not present in the cache memory means, newly storing the image data which is to be newly written into the image memory means into the cache memory means with the coordinate values represented by DX and DY, but before updating the cache memory means, if old different coordinate values and data for writing into different coordinates are already present in a newly storing position of the cache memory means, writing the old values already present in a position pointed by said different coordinates before updating the cache memory means with new coordinates and new data, and when finishing a coordinate transformation from the source image to the destination image, writing all data in the cache memory means, but not yet written into the image memory means, into the image memory means.

5. An image data processing system for performing coordinate transformation about a pixel position of image data between source image data and destination image data, comprising:

image memory means for storing the source and destination image data; and, an image data processor for transforming the source image data stored in the image memory and storing the transformed data into the image memory means, the image data processor comprising:

coordinate calculating means for scanning a pixel position represented by DX and DY in a destination image, and calculating a memory address of said pixel position in the destination image, a pixel position represented by SX and SY in a source image which is to be transferred to said pixel position in the destination image by a transformation process, and a memory address of said pixel position in the source image;

cache memory means for storing the source image data read from said memory address of said pixel position in the source image calculated by the coordinate calculating means with said pixel position represented by SX and SY in the source image;

data write control means for writing the image data into a memory address of said pixel position in the destination image calculated by said coordinate calculating means; and, cache control means for controlling the cache memory means in response to source coordinate values represented by SX and SY calculated by the coordinate calculating means, wherein lower bits of SX and lower bits of SY are used as an index and higher bits of SX and higher bits of SY are used as a tag whereby geometrically near parts of the source image can be stored in the cache simultaneously.

6. The image data processing system according to claim 5, wherein coordinate transformation in the coordinate calculating means is affine transformation.

7. The image data processing system according to claim 5, wherein the image memory means includes means for reading and writing through one accessing operation of a zone which is long in its horizontal or vertical direction, and further includes means for accessing of the image data stored in the image memory means by sequential advancement in the vertical or horizontal direction.

8. The image data processing system according to claim 5, wherein the cache means is located in the image data processor.

9. An image data processing system for performing coordinate transformation about a pixel position of image data between source image data and destination image data, comprising:

image memory means for storing the source and destination image data; and, an image data processor for transforming the source image data stored in the image memory and storing the transformed data into the image data processor comprising:

data read control means for controlling the image memory means so that the source image data is read from the image memory means in response to a memory address;

coordinate calculating means for scanning a pixel position in a source image, and calculating a memory address of said pixel position represented by SX and SY in the source image, a pixel position in a destination image represented by DX and DY to which said pixel position in the source image is to be transferred by a transformation process, and a memory address of said pixel position in the destination image;

cache memory means for storing the destination image data which are to be written into the image memory means at said memory address of said pixel position in the destination image calculated by the coordinate calculating means with said pixel position represented by DX and DY in the destination image; and cache memory control means for controlling the cache memory means in response to the destination coordinate values represented by DX and DY calculated by said coordinate calculating means, wherein lower bits of DX and lower bits of DY are used as an index and higher bits of DX and higher bits of DY are used as a tag whereby geometrically near parts of the destination image can be stored in the cache simultaneously.

10. The image data processing system according to claim 9, wherein coordinate transformation in the coordinate calculating means is affine transformation.

11. The image data processing system according to claim 9, wherein the image memory means includes means for reading and writing through one accessing operation of a zone which is long in its horizontal or vertical direction, and further includes means for accessing of the image data stored in the image memory means by sequential advancement in the vertical or horizontal direction.

12. The image data processing system according to claim 9, wherein the cache means is located in the image data processor.

13. An image data processing method of performing coordinate transformation about a pixel position of image data between source image data and destination image data, comprising the steps of:

scanning a pixel position represented by DX and DY in a destination image, and calculating a memory address of said pixel position in the destination image, a pixel position represented by SX and SY in a source image which is to be transferred to said pixel position in the destination image by a transformation process, and a memory address of said pixel position in the source image;

storing the source image data read from said memory address of said pixel position in the source image into a cache memory means, storing with said pixel position represented by SX and SY in the source image;

writing the image data into a memory address of said pixel position in the destination image; and, when storing the image data in the cache memory means, respond to source coordinate values represented by SX and SY, use lower bits of SX and lower bits of SY as an index and use higher bits of SX and higher bits of SY as a tag whereby geometrically near parts of the source image can be stored in the cache simultaneously.

14. An image data processing method of performing coordinate transformation about a pixel position of image data between source image data and destination image data, comprising the steps of:

scanning a pixel position represented by SX and SY in a source image, and calculating a memory address of said pixel position in the source image, a pixel position represented by DX and DY in a destination image to which said pixel position in the source image is to be transferred by a transformation process, and a memory address of said pixel position in the destination image;

reading the source image data from an image memory means in response to a memory address of said pixel position in the source image;

storing the destination image data which are to be written into the image memory means into a cache memory means with said pixel position represented by DX and DY in the destination image; and, when storing the destination image data in the cache memory means, respond to destination coordinate values represented by DX and DY, use lower bits of DX and lower bits of DY as an index and use higher bits of DX and higher bits of DY as a tag so that geometrically near parts of the destination image can be stored in the cache simultaneously.

* * * * *